3,060,192
PRODUCTION OF ENANTIOMERS OF ALPHA-METHYL-PHENETHYL HYDRAZINE AND INTERMEDIATE
Jack Bernstein and Kathryn A. Losee, New Brunswick, N.J., assignors to Olin Mathieson Chemical Corporation, New York, N.Y., a corporation of Virginia
No Drawing. Filed Apr. 29, 1959, Ser. No. 809,607
2 Claims. (Cl. 260—326.3)

This invention relates to new and useful organic hydrazine derivatives.

An object of this invention is the provision of new and useful optically active isomers of α-methyl-phenethylhydrazine and non-toxic acid addition salts thereof.

Another object of this invention is the provision of new and useful N'-acyl derivatives of α-methyl-phenethylhydrazine and acid addition salts thereof.

Yet another object of this invention is the provision of an improved process for preparing α-methyl-phenethylhydrazine and optically active forms thereof.

A further object of this invention is the provision of a method for preparing the hydrazides and salts of this invention.

The method of this invention essentially comprises: (A) reacting phenyl-2-propanone with a primary acylhydrazine of the Formula I: RCO—NHNH$_2$, wherein R is an organic radical (formed by the reaction of a monobasic carboxylic acid, which may, or may not, be optically active, with hydrazine) to yield an N'-acylhydrazone having the following Formula II:

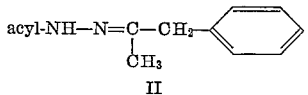

II wherein the term acyl indicates the acyl radical of a monobasic carboxylic acid, and (B) reacting the hydrazone with a reducing agent to yield the new N'-acyl derivatives of α-methyl-phenethylhydrazine of this invention having the following Formula III:

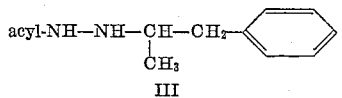

III wherein acyl is as hereinbefore defined.

The N-acylhydrazine derivatives of Formula III are new pharmacologically active compounds as hereinafter described. In addition, these acylhydrazine derivatives are useful intermediates in the preparation of α-methyl-phenethylhydrazine, formed by hydrolyzing off the acyl group. By the practice of the process of this invention, utilizing the new acylhydrazine derivatives of this invention, an improved process for preparing α-methyl-phenethylhydrazine is thus afforded. In contrast to the straight forward method for obtaining α-methyl-phenethylhydrazine by reacting unsubstituted hydrazine with phenyl-2-propanone, a process which gives only low yields of α-methyl-phenethylhydrazine in admixture with the undesired N,N'-bis(phenylisopropyl) hydrazine derivative, through the practice of this invention and final hydrolysis of the new acylhydrazine intermediates, α-methyl-phenethylhydrazine is obtained to the exclusion of the undesired N,N'-disubstituted hydrazine by-product.

Moreover, if an optically active acid is employed in preparing the N-acylhydrazine reactant, the resulting diastereoisomers of Formula II are further useful as intermediates for the separation of α-methyl-phenethylhydrazine into its dextro and levo optical isomers, the former having significantly higher activity than either its antipode or its racemate. This separation can be accomplished by contacting the mixture of Formula III with a solvent in which only one isomer is soluble, separating the insoluble isomer, separately recovering the soluble isomer, and hydrolyzing each isomer to yield the corresponding dextro and levo enantiomers of α-methyl-phenethylhydrazine.

Among the N-acylhydrazines of Formula III of this invention are the following compounds:

(1) N'-(α-methyl-phenethyl)-N-acetylhydrazine
(2) N'-α-methyl-phenethyl)-N-propionylhydrazine
(3) N'-(α-methyl-phenethyl)-N-benzoylhydrazine
(4) N'-(α-methyl-phenethyl)-N-p-tolylhydrazine
(5) N'-(α-methyl-phenethyl)-N-1-naphthoylhydrazine
(6) N'-(α-methyl-phenethyl)-N-phenacetylhydrazine
(7) N'-(α-methyl-phenethyl)-N-cinnamoylhydrazine
(8) N'-(α-methyl-phenethyl)-N-acryloylhydrazine
(9) N'-(α-methyl-phenethyl)-N-acetylhydrazine monohydrochloride
(10) N'-(α-methyl-phenethyl)-N-phenacetylhydrazine mononitrate
(11) N'-(α-methyl-phenethyl)-N-isonicotinoylhydrazine
(12) N'-(α-methyl-phenethyl)-N-isonicotinoylhydrazine dihydrochloride
(13) N'-(α-methyl-phenethyl)-N-picolinoylhydrazine
(14) N'-(α-methyl-phenethyl)-N-nicotinoylhydrazine
(15) N'-(α-methyl-phenethyl)-N-6-oxo-piperidyl-2-carbonylhydrazine
(16) N'-(α-methyl-phenethyl)-N-piperidyl-2-carbonylhydrazine
(17) N'-(α-methyl-phenethyl)-N-pyroglutamoylhydrazine
(18) N'-(α-methyl-phenethyl)-N-pyroglutamoylhydrazine dihydrochloride
(19) N'-(α-methyl-phenethyl)-N-pyrrolyl-2-carbonylhydrazine
(20) N'-(α-methyl-phenethyl)-N-lactoylhydrazine
(21) N'-(α-methyl-phenethyl)-N-mandeloylhydrazine In order to prepare the compounds of this invention by the process of this invention phenyl-2-propanone is reacted with a hydrazide of a monobasic carboxylic acid of the Formula I, to yield the N'-acylhydrazone of phenyl-2-propanone as represented by Formula II above. The reaction is preferably conducted with equimolar amounts of ketone and hydrazide, although excess of either may be present. For optimal yields it is desirable to conduct the reaction in the presence of an organic solvent such as a lower alkanol (e.g., ethyl alcohol), under anhydrous conditions and at elevated temperatures up to and including reflux temperatures. Any monobasic carboxylic acid primary hydrazide may be used in the reaction. Among the useful compounds of the Formula I there may be named inter alia hydrazides of the following acids: lower alkanoic acids (e.g., acetic, propionic, butyric, isobutyric, valeric and caproic acids); hydroxyloweralkanoic acids (e.g., dextro, levo and racemic lactic acid); mono- and bicyclic aryl acids (e.g., benzoic, p-toluic and naphthoic acids); monocyclicaryloweralkanoic and loweralkenoic acids (e.g., phenylactetic and cinnamic acids); lower alkenoic acids (e.g., acrylic and methacrylic acids); monocyclic aryl-hydroxyloweralkanoic acids (e.g., mandelic acid); and 5 and 6 membered-N-monoheterocyclic carboxylic acids (e.g., picolinic, isonicotinic, nicotinic, pyrrole-2-carboxylic, 6-oxo-piperidyl-2-carboxylic, piperidyl-2-carboxylic and pyroglutamic acids).

Compounds of Formula II are then reduced by conventional means to yield the acylhydrazines of Formula III. A suitable procedure consists in contacting the starting material, in a solution of alcohol, with platinum oxide in the presence of palladium on charcoal. The reduction may be carried out at room temperature and at pressures of from 15 to 200 p.s.i. and is completed when a theoretical amount of hydrogen has been absorbed. Alternatively, compounds of Formula II may be reduced by contact with an aqueous alkanolic mixture of an alkali metal borohydride. The compounds of Formula I are separated from the borohydride mixture by standard procedures.

To prepare the pure dextro and levo α-methyl-phenethyl-hydrazines of this invention, an optically active mixture of hydrazines of Formula III is prepared by reacting an acylhydrazine of the Formula I, wherein the acyl group is the radical of an optically active acid with phenyl-2-propanone and reducing the resulting hydrazones. The resulting mixture is then separated into its optically active components by treating the mixture with a liquid which is a solvent for only one of the diastereoisomers. The insoluble isomer precipitates while the other remains dissolved in the liquid medium. Suitable solvents for separating the isomers in this manner are the conventional inorganic solvents, such as water; and organic solvents such as autonitrile. The precipitated isomer is separated by filtration from the mother liquid which retains the soluble isomer. Each isomer is purified and then separately subjected to hydrolysis to yield a hydrolysis product which contains only one enantiomer of α-methyl-phenethylhydrazine.

The acid addition salts of the enantiomers of α-methyl-phenethylhydrazine, as well as of the acylhydrazines of Formula III, can be prepared in the conventional manner by treating the base with the desired acid. Suitable acids include non-toxic mineral acids, such as the hydrohalic (e.g., hydrochloric), sulfuric, nitric and phosphoric acid, and non-toxic organic acids such as acetic, propionic, tartaric, citric, oxalic and benzoic acid.

The compounds of this invention i.e., the acyl derivatives of Formula III, dextro-α-methyl-phenethylhydrazine, levo-α-methyl-phenethylhydrazine and the non-toxic addition salts thereof, are pharmacologically active substances of low toxicity which may be used in both human and veterinary medicine as anti-depressants, i.e., resurgitives. The compounds are useful for example, in the treatment of case of neurosis characterized by states of depression and for this purpose they may be administered in dosages and by routes (e.g., perorally) prescribed for amphetamine per se.

The following examples are presented to more fully illustrate the invention.

EXAMPLE I

(A) N-Isonicotinoyl-N'-(α-Methyl-Phenethylidene) Hydrazine

A solution of phenyl-2-propanone (40.2 g.) and isonicotinic acid hydrazide (41.1 g.) in 1 liter of absolute ethyl alcohol is refluxtd for 8 hours. The alcohol is removed under reduced pressure and the very viscous residue triturated with 500 ml. of toluene to yield about 64 g. of a product melting at about 108–110° C. Recrystallization from toluene yields the pure product melting at about 110–111° C.

(B) N-Isonicotinoyl-N'-(α-Methyl-Phenethyl) Hydrazine

A solution of N-isonicotinoyl-N'-(α-methyl-phenethylidene)-hydrazine (12.8 g.) in 100 ml. of ethyl alcohol, in the presence of $PtO_2$ (100 mg.) and 5% Pd (1 g.) on charcoal is shaken at room temperature and 50 p.s.i. until the theoretical amount of hydrogen is absorbed. The catalyst is filtered and the alcohol removed under reduced pressure. The viscous residue is dissolved in 30 ml. of toluene and to this solution is added 70 ml. of hexane. Upon trituration a white crystalline solid, melting at about 84–86° C., is formed. After recrystallization from toluene-hexane (1:6) the pure product melting at about 84–86° C. is obtained.

Following the procedure of I(A) except for the substitution of equimolar amounts of the hydrazides of picolinic acid and nicotinic acid for the hydrazide of isonicotinic acid there are obtained the corresponding N'-(α-methyl-phenethylidene) hydrazides of picolinic acid and nicotinic acid. Substituting the latter hydrazides into I(B) for the N-isonicotinoyl-N'-(α-methyl-phenethyl) hydrazine, there are obtained the corresponding N'-(α-methyl-phenethyl)hydrazides of picolinic acid and nicotinic acid.

EXAMPLE II

N-Isonicotinoyl-N'-(α-Methyl-Phenethyl) Hydrazine, Oxalic Acid Salt

To a solution of N-isonicotinoyl-N'-(α-methyl-phenethyl)hydrazine (9.0 g.) in 75 ml. of absolute ethyl alcohol is added a solution of oxalic acid (5 g.) in 50 ml. of absolute ethyl alcohol. On cooling about 7 g. of the di-oxalate of M.P. 101–103° C. (with decomposition) crystallizes out. After recrystallization from acetonitrile the pure compound has a constant melting point at about 103–105° C. (with decomposition).

In a similar manner the dioxalic acid salts of N'-(α-methyl-phenyl) hydrazides of picolinic and nicotinic acid are readily obtained.

EXAMPLE III

(A) N-Acetyl-N'-(α-Methyl-Phenethylidene) Hydrazine

A solution of acetic acid hydrazide (74 g.) and phenyl-2-propanone (134 g.) in 500 ml. of absolute ethyl alcohol is refluxed for 5 hours. The alcohol is removed under reduced pressure and the viscous residue triturated with water to yield about 144 g. of the crystalline product melting at about 103–105° C. After recrystallization from hexane the product has a constant melting point at about 104–105° C.

(B) N-Acetyl-N'-(α-Methyl-Phenethyl) Hydrazine

A suspension of N-acetyl-N'-(α-methyl-phenethylidene)hydrazine (57 g.) in 200 ml. of absolute ethyl alcohol is shaken for 24 hours at 60–70° C. and 50 p.s.i. in the presence of 200 mg. of $PtO_2$ and 1 g. of 5% Pd on charcoal. The catalyst is filtered off and the alcohol removed under reduced pressure. To the residue is added 750 ml. of hexane (crystallization occurs and a solid is formed weighing about 49 g. and melting at about 75–77° C.) After recrystallization from hexane the pure product melting at about 76–77° C. is obtained.

Following the procedure of III(A), except for the substitution of equimolar amounts of the hydrazides of propionic acid, benzoic acid and phenylacetic acid for the acetic acid hydrazide there are obtained the corresponding N'-(α-methyl-phenethylidene) hydrazides of propionic benzoic and phenylacetic acids. Substituting these hydrazides into the procedure of III(B), the corresponding N'-(α-methyl-phenethyl)hydrazides of propionic, benzoic and phenylacetic acids are obtained.

EXAMPLE IV

α-Methyl-Phenethylhydrazine Hydrochloride

A solution of N-acetyl-N'-(α-methyl-phenethyl)hydrazine (5 g.) in 50 ml. of 10% HCl is refluxed for 4 hours. The aqueous HCl is removed under reduced pressure and the viscous residue is triturated with 30 ml. of absolute ethyl alcohol and the alcohol then removed. The remaining white crystalline solid is washed with dry ether and the ether removed by filtration to yield about 4 g. of a crystalline product melting at about 115–117° C. After recrystallization from an alcohol-ether mixture the product melting at about 117–118° C is obtained.

Similarly, by substituting the N'-(α-methyl-phenethyl) hydrazides of propionic, benzoic and phenylacetic acids for N-acetyl-N'-(α-methyl-phenethyl)hydrazine in Example IV, the corresponding hydrochlorides are obtained.

EXAMPLE V

(A) L-Pyroglutamic Acid, N'-(α-Methyl-Phenethylidene)Hydrazide

A solution of L-pyroglutamic acid hydrazide (39 g.) and phenyl-2-propanone (36.2 g.) in 500 ml. of absolute ethyl alcohol is refluxed for seven hours. The alcohol is removed under reduced pressure and upon cooling crystallization begins. The crystals are separated by filtration, recrystallized from ethyl alcohol and finally recrystallized from ether. The crystalline product melting at about 152–154° C. weighs about 49 g. and represents a yield of about 70%.

*Analysis.*—Calcd. for $C_{14}H_{17}N_3O_2$: C, 64.84; H, 6.61. Found: C, 64.26; H, 6.67.

$[\alpha]_D^{27} = +17°$ (in water).

(B) L-(±) Pyroglutamic Acid, N'-(α-Methyl-Phenethyl)Hydrazide

To a suspension of L-pyroglutamic acid, N'-(α-methyl-phenethylidene)-hydrazide (56 g.) in 300 ml. of methanol, is added sodium borohydride (15.9 g.) suspended in 100 ml. of water. The borohydride is added slowly and with constant stirring. The temperature rises to 40° C upon starting the addition, and the solution becomes clear. At the end of the addition the temperature of the mixture rises to 60° C and there is a gentle refluxing action with a mild evolution of gas. The reaction mixture is allowed to stand for two hours, prior to being used in sections C and D below.

(C) (d)-α-Methyl-Phenethylhydrazine and Hydrochloride

The methanolic reaction mixture prepared in section B is subjected to reduced pressure to remove the methanol. The residue is treated with 500 ml. of water and the crystalline solid which precipitates is filtered off. It weighs about 30 g. and has a melting point about 138–142° C. The mother liquor is retained for further treatment in section D. Recrystallization of the precipitate from 300 ml. of water yields about 14 g. of crystalline L(+)-pyroglutamic acid, N'-(α-methyl-phenethyl)hydrazide (M.P. about 157–159° C.). The sample is crystallized from water.

Melting point about 163–169° C.

*Analysis.*—Calcd. for $C_{14}H_{19}N_3O_2$: N, 16.08; C, 64.34; H, 7.32. Found: N, 16.01; C, 64.39; H, 7.20.

$[\alpha_D] = +24.4°$ (in water).

The L(+)-pyroglutamic acid, N'-(α-methyl-phenethyl)hydrazide (14 g.) is dissolved in 140 ml. of 10% HCl and refluxed for three hours, after which time the major portion of the aqueous HCl is removed under reduced pressure. The residue is dissolved in 100 ml. of water and made strongly alkaline with 50% NaOH (saturated with potassium carbonate). (d)-α-methyl-phenethylhydrazine precipitates as an oil and is twice extracted with 200 ml. of ether each time. The extracts are dried over $MgSO_4$, filtered and the filtrate acidified with 1.5 N ethereal HCl until acid to Congo. The white crystalline precipitate which forms is filtered, dried and recrystallized from 800 ml. of acetonitrile to yield about 5.5 g. of the crystalline hydrochloride of (d)-α-methyl-phenethylhydrazine melting point about 148–149° C.;

$[\alpha]_D = +13.8°$; (in water)

*Analysis.*—Calcd. for $C_9H_{14}N_2 \cdot HCl$; N, 15.00; Cl, 18.99. Found: N, 14.81; Cl, 18.70.

(D) (1)-α-Methyl-Phenethylhydrazine and Hydrochloride

The retained mother liquor from section C is permitted to evaporate at room temperature and the resulting residue is extracted with hot ethyl acetate. The extract is dried over $MgSO_4$, filtered and allowed to evaporate to yield a solid (M.P. about 65–67° C.) which is recrystallized from ethyl acetate to yield crystalline L(—)-pyroglutamic acid, N'-(α-methyl-phenethyl)hydrazide melting at about 80–83° C.

*Analysis.*—Calcd. for $C_{14}H_{19}N_3O_2$; N, 16.08; C, 64.34; H, 7.32. Found: N, 16.01; C, 64.39; H, 7.20.

$[\alpha]_D = -14.6°$ (in water).

The L(—)-pyroglutamic acid, N'-(α-methyl-β-phenethyl)hydrazide (16 g.) thus obtained, is dissolved in 160 ml. of 10% HCl and refluxed for three hours, after which, the aqueous HCl is removed under reduced pressure leaving a viscous residue which is dissolved in water and made strongly alkaline with 50% NaOH. (d)-α-methyl-phenethylhydrazine precipitates as an oil and is twice extracted with 250 ml. ether. The ethereal extracts are dried over $K_2CO_3$, filtered and the filtrate made strongly acid to Congo with 1.5 N ethereal HCl. A crystalline precipitate forms and is filtered to yield about 10 g. (90%) of a solid melting at about 119–124° C. The solid, after three crystallizations from 500 ml. of acetonitrile each time, and a final recrystallization from 550 ml. of ethyl acetate-ethyl alcohol (10:1) yields the crystalline hydrochloride of (1)-α-methyl-phenethylhydrazine (M.P. about 148–149° C.).

*Analysis.*—Calcd. for $C_9H_{14}N_2 \cdot HCl$: N, 15.00; Cl, 18.99. Found: N, 15.09; Cl, 19.01.

$[\alpha]_D^{25} = -14.0°$ (in water).

The invention may be variously otherwise embodied within the scope of the appended claims.

What is claimed is:

1. Pyroglutamic acid, N'-(α-methyl-phenethyl)hydrazide.

2. The method which comprises reacting phenyl-2-propanone with L-pyroglutamic acid hydrazide, reducing the resulting N-L-pyroglutamoyl-N'-(α-methyl-phenethylidene)hydrazine to obtain a mixture of the diastereoisomers of N-L-pyroglutamoyl-N'-(α-methyl-phenethyl)-hydrazine, separating the mixture into its diastereoisomeric components and hydrolyzing each component to obtain the corresponding enantiomer of α-methyl-phenethylhydrazine.

References Cited in the file of this patent
UNITED STATES PATENTS

| | | |
|---|---|---|
| 2,701,815 | Boker et al. | Feb. 8, 1955 |
| 2,743,276 | Anderson | Apr. 24, 1956 |
| 2,744,935 | Johner | May 8, 1956 |
| 2,763,662 | Archer | Sept. 18, 1956 |
| 2,894,972 | Bloom et al. | July 14, 1959 |
| 2,923,713 | Fox | Feb. 2, 1960 |

FOREIGN PATENTS

| | | |
|---|---|---|
| 722,679 | Great Britain | Jan. 26, 1955 |
| 203,499 | Austria | May 25, 1959 |

OTHER REFERENCES

Karrer: Organic Chemistry, Elsevier, N.Y., pp. 87 to 96; 120, 438 and 455–456 (1938).

Sah: J. Am. Pharm. Assoc., vol. 43, pp. 513–24 (1954).